United States Patent
Yi et al.

(10) Patent No.: US 8,572,476 B2
(45) Date of Patent: Oct. 29, 2013

(54) MOBILE TERMINAL AND METHOD OF CONTROLLING THE OPERATION OF THE MOBILE TERMINAL

(75) Inventors: Il Byoung Yi, Seoul (KR); Sung Pil Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 12/829,585

(22) Filed: Jul. 2, 2010

(65) Prior Publication Data

US 2011/0138267 A1    Jun. 9, 2011

(30) Foreign Application Priority Data

Dec. 9, 2009    (KR) .................. 10-2009-0121912

(51) Int. Cl.
*G06F 17/00* (2006.01)

(52) U.S. Cl.
USPC ........... 715/234; 715/785; 715/784; 715/251; 715/738; 715/851; 715/786; 715/760; 345/173

(58) Field of Classification Search
USPC ......... 715/204–206, 240, 251, 274, 738, 835, 715/851, 863–864, 234, 273, 700, 760, 715/784–786, 830; 707/E17.112, 707/E17.118–E17.119; 358/1.15, 1.18; 345/173–178
See application file for complete search history.

(56) References Cited

U.S. PATENT DOCUMENTS

| | | | | |
|---|---|---|---|---|
| 6,061,700 A * | 5/2000 | Brobst et al. | ................ | 715/206 |
| 6,222,634 B1 * | 4/2001 | Dubbels et al. | ............ | 358/1.15 |
| 6,958,981 B1 * | 10/2005 | Hemminger | ................ | 370/270 |
| 7,222,306 B2 * | 5/2007 | Kaasila et al. | ................ | 715/801 |
| 7,225,407 B2 * | 5/2007 | Sommerer et al. | ........... | 715/738 |
| 7,409,419 B2 * | 8/2008 | Iwaishi et al. | ................ | 709/202 |
| 7,441,207 B2 * | 10/2008 | Filner et al. | ................ | 715/864 |
| 7,830,542 B2 * | 11/2010 | Kawabuchi et al. | ........ | 358/1.18 |
| 7,911,635 B2 * | 3/2011 | Kimura | ................ | 358/1.15 |
| 7,962,843 B2 * | 6/2011 | Milic-Frayling et al. | ..... | 715/206 |
| 8,069,410 B2 * | 11/2011 | Sylthe et al. | ................ | 715/234 |
| 2002/0054052 A1 | 5/2002 | Sharma et al. | ................ | 715/700 |
| 2002/0135602 A1 | 9/2002 | Davis et al. | ................ | 345/684 |
| 2002/0171872 A1 * | 11/2002 | Matsunaga | ................ | 358/1.18 |
| 2004/0001104 A1 * | 1/2004 | Sommerer et al. | ........... | 345/811 |
| 2004/0205639 A1 * | 10/2004 | Drane et al. | ................ | 715/527 |
| 2005/0132018 A1 | 6/2005 | Milic-Frayling et al. | ..... | 709/213 |
| 2005/0223342 A1 * | 10/2005 | Repka et al. | ................ | 715/851 |
| 2006/0069670 A1 | 3/2006 | Khaliq et al. | .......... | 707/999.003 |
| 2006/0101330 A1 * | 5/2006 | Godley | ................ | 715/513 |
| 2006/0156240 A1 * | 7/2006 | Lemay et al. | ................ | 715/730 |

(Continued)

OTHER PUBLICATIONS

European Search Report dated Dec. 15, 2011 for Application No. 10169231.7.

*Primary Examiner* — Cesar Paula
*Assistant Examiner* — James H Blackwell
(74) *Attorney, Agent, or Firm* — KED & Associates, LLP

(57) ABSTRACT

A mobile terminal and a method may be provided for controlling an operation of the mobile terminal. This may include displaying a first webpage on a display module, and if a second webpage is chosen to be displayed, determining whether the second webpage is provided by the same website that provides the first webpage. If the second webpage is provided by the same website that provides the first webpage, the first and second webpages may be merged into a third webpage and the third webpage may be displayed on the display module. Therefore, a plurality of webpages provided by a same webpage may be displayed at a same time by merging the webpages into a single webpage.

13 Claims, 17 Drawing Sheets

(56) References Cited

U.S. PATENT DOCUMENTS

2008/0294974 A1* 11/2008 Nurmi et al. ............... 715/204
2009/0164887 A1* 6/2009 Ikegami ..................... 715/247
2010/0093325 A1* 4/2010 Jang .......................... 455/414.2
2010/0131898 A1* 5/2010 Hiraiwa ...................... 715/818
2010/0180225 A1* 7/2010 Chiba et al. ................ 715/777
2011/0066982 A1* 3/2011 Paulsami et al. ............ 715/835

* cited by examiner

FIG. 6

| LG Mobile 'Incite' Suffers From Poor Sales | |
|---|---|
| Write | 2009-11-06 |

440 — LG Electronics' ambitious and latest smart phone "Incite" has been struggling in the South Korean market, a result of controversy over unstable mobile software systems and lower specification than its North American version.
Sales were tumbling, though the Incite is more competitively priced than the model produced by its bigger rival Samsung Electronics, the "Omnia, 1/3

| 'Crystallizing' Rises as Fashionable 'It' Trend | |
|---|---|
| Write | 2009-11-06 |

450 — Sparkling crystals, whether clear or colored, are the hottest things in fashion these days. Everything from T-shirts and lingerie to sunglasses and cell phones are being sprinkled with hundreds of twinkling crystals.
Supermodels like Giselle Bundchen and Heidi Klum modeled sexy lingerie embellished 2/3 — 453
with crystals and beads during a recent Victoria's Secret fashion show. Designer brands Escada and Dolce & Gabbana used

| Naro Satellite Destroyed | |
|---|---|
| Write | 2009-11-06 |

460 — GOHEUNG, South Jeolla Province — Engineers and officials say that the cone of the Korean rocket that contained the satellite opened later than it was supposed to, causing the satellite to miss the designated orbit.
However, they say the exact cause can't be determined until further investigations are 3/3
carried out. The initial conclusion acquitted the Russians, the provider of the first-stage rocket and related technologies,

ns.

MOBILE TERMINAL AND METHOD OF CONTROLLING THE OPERATION OF THE MOBILE TERMINAL

This application claims the priority from Korean Patent Application No. 10-2009-0121912, filed Dec. 9, 2009, the subject matter of which is hereby incorporated by reference.

BACKGROUND

1. Field

Embodiments of the present invention may relate to a mobile terminal and a method of controlling an operation of the mobile terminal in which a plurality of webpages provided by a website may be merged into a single webpage and may be displayed together at a same time.

2. Background

Mobile terminals are portable devices that may provide users with various services such as a voice calling service, a video calling service, an information input/output service, and/or a data storage service.

As types of services provided by mobile terminals diversify, an increasing number of mobile terminals may be equipped with various complicated functions such as capturing photos or moving pictures, playing music files or moving image files, providing game programs, receiving broadcast programs and/or providing wireless internet services, and have thus evolved into multimedia players.

Attempts have been made to realize complicated functions as hardware devices and/or software programs. For example, various user interface (UI) environments have been developed in which users are allowed to easily search for and choose desired functions.

Forward or backward navigation may be required in order to navigate from one webpage to another webpage using a mobile terminal. When there is the need to view two or more webpages one after another or to compare webpages with one another, users may be required to sequentially open the webpages and move back and forth between the webpages through forward or backward navigation regardless of whether the webpages are provided by a same website. This may cause inconvenience and may make it difficult to identify content of each of the webpages.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention may hereinafter be described in detail with reference to the accompanying drawings in which exemplary embodiments are shown.

The term 'mobile terminal' as used herein may indicate a mobile phone, a smart phone, a laptop computer, a digital broadcast receiver, a personal digital assistant (PDA), a portable multimedia player (PMP), and/or a navigation device. The terms 'module' and 'unit' may be used interchangeably.

Figure 1:
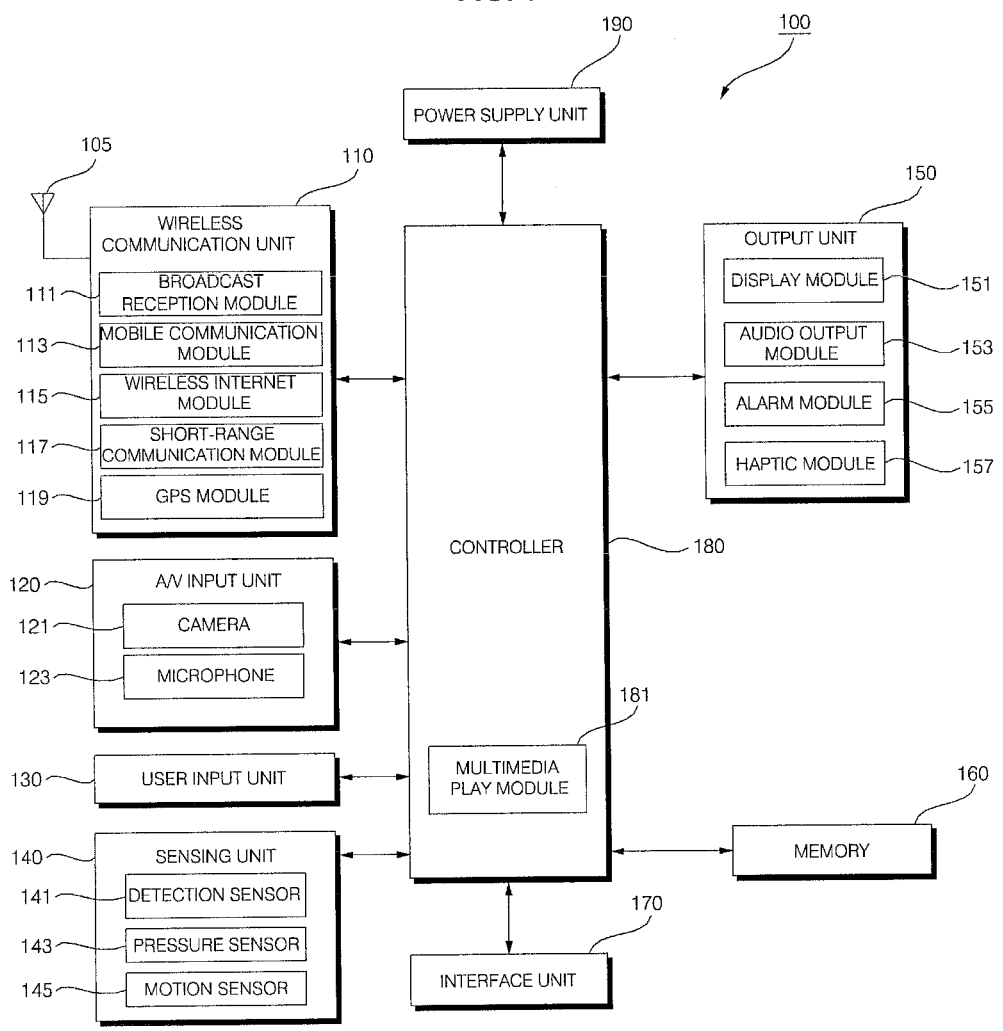
FIG. 1 illustrates a block diagram of a mobile terminal according to an exemplary embodiment.

FIG. 1 illustrates a block diagram of a mobile terminal 100 according to an example embodiment. Other embodiments and configurations may also be provided.

As shown in FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and/or a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server that generates broadcast signals and/or broadcast-related information and transmits the generated broadcast signals and/or the generated broadcast-related information or may be a server that receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, a combination of a data broadcast signal and a TV broadcast signal and/or a combination of a data broadcast signal and a radio broadcast signal. The broadcast-related information may be provided to the mobile terminal 100 through a mobile communication network. The broadcast-related information may be received by the mobile communication module 113 rather than by the broadcast reception module 111. The broadcast-related information may come in various forms.

The broadcast reception module 111 may receive the broadcast signal using various broadcasting systems. The broadcast reception module 111 may be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receive wireless signals from at least one of a base station, an external terminal, and/or a server through a mobile communication network. The wireless signals may include various types of data according to whether the mobile terminal 100 transmits/receives voice call signals, video call signals, and/or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and/or High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and/or ZigBee.

The GPS module 119 may receive position information from a plurality of GPS satellites.

The A/V input unit 120 may receive audio signals and/or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, and/or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise (or noise reduction algorithms to reduce noise) that may be generated during reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, and/or a finger mouse. If the user input unit 130 is implemented as a touch pad and forms a layer structure together with the display module 151, the user input unit 130 and the display module 151 may be collectively referred to as a touch screen.

The sensing unit 140 may determine a current state of the mobile terminal 100 such as whether the mobile terminal 100 is opened up or closed, a position of the mobile terminal 100 and whether the mobile terminal 100 is placed in contact with a user, and may generate a sensing signal for controlling operation of the mobile terminal 100. For example, when the mobile terminal 100 is a slider-type mobile phone, the sensing unit 140 may determine whether the mobile terminal 100 is opened up or closed. The sensing unit 140 may determine whether the mobile terminal 100 is powered by the power supply unit 190 and/or whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the object (or entity). More specifically, the detection sensor 141 may detect an object that is nearby and approaching by detecting a change in an alternating magnetic field or a rate of change of static capacitance. The sensing unit 140 may include two or more detection sensors 141.

The pressure sensor 143 may determine whether pressure is being applied to the mobile terminal 100 or may measure a level of pressure, if any, applied to the mobile terminal 100. The pressure sensor 143 may be installed in a certain part of the mobile terminal 100 where detection of pressure may be necessary. For example, the pressure sensor 143 may be installed in the display module 151. It may be possible to differentiate a typical touch input from a pressure touch input that is generated using a higher pressure level than that used to generate a typical touch input based on data provided by the pressure sensor 143. Additionally, when a pressure touch input is received through the display module 151, the level of pressure applied to the display module 151 may be determined upon detection of a pressure touch input based on data provided by the pressure sensor 143.

The motion sensor 145 may determine location and motion of the mobile terminal 100 using an acceleration sensor and/or a gyro sensor.

Acceleration sensors may be a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as a motion of a hand as performed in gaming input devices. One or more acceleration sensors representing two or three axial directions may be incorporated into a single package. There may be cases when detection of only one axial direction, for example, a Z-axis direction, may be necessary. Thus, when an X- or Y-axis acceleration sensor, rather than a Z-axis acceleration sensor, may be required, the X- or Y-axis acceleration sensor may be mounted on an additional substrate, and the additional substrate may be mounted on a main substrate.

Gyro sensors may be sensors for measuring angular velocity, and may determine a relative direction of rotation of the mobile terminal 100 to a reference direction.

The output unit 150 may output audio signals, video signals and/or alarm signals. The output unit 150 may include the display module 151, an audio output module 153, an alarm module 155, and/or a haptic module 157.

The display module 151 may display various information processed by the mobile terminal 100. For example, if the mobile terminal 100 is in a call mode, the display module 151 may display a user interface (UI) and/or a graphic user interface (GUI) for making or receiving a call. If the mobile terminal 100 is in a video call mode and/or an image capturing mode, the display module 151 may display a UI or a GUI for capturing and/or receiving images.

If the display module 151 and the user input unit 130 together form a layer structure and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel may be a transparent panel attached onto an exterior of the mobile terminal 100 and may be connected to an internal bus of the mobile terminal 100. The touch screen panel may keep monitoring whether the touch screen panel is being touched by the user. Once a touch input to the touch screen panel is received, the touch screen panel may transmit a number of signals corresponding to the touch input to the touch screen panel controller. The touch screen panel controller may process the signals transmitted by the touch screen panel, and transmit the processed signals to the controller 180. The controller 180 may determine whether a touch input has been generated and which part of the touch screen panel has been touched based on the processed signals transmitted by the touch screen panel controller.

The display module 151 may include electronic paper (e-paper). E-paper is a type of reflective display technology and may provide as high resolution as ordinary ink on paper, wide viewing angles, and/or excellent visual properties. E-paper may be implemented on various types of substrates such as a plastic, a metallic and/or a paper substrate and may display and maintain an image thereon even after power is cut off. Additionally, e-paper may reduce power consumption of the mobile terminal 100 because it does not require a backlight assembly. The display module 151 may be implemented as e-paper by using electrostatic-charged hemispherical twist balls, using electrophoretic deposition, and/or using microcapsules.

The display module 151 may include at least one of a liquid crystal display (LCD), a thin film transistor (TFT)-LCD, an organic light-emitting diode (OLED), a flexible display, and/or a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, and/or a broadcast reception mode and/or may output audio data present in the memory 160. Additionally, the audio output module 153 may output various sound signals associated with functions of the mobile terminal 100 such as receiving a call or a message. The audio output module 153 may include a speaker and a buzzer.

The alarm module 155 may output an alarm signal indicating an occurrence of an event in the mobile terminal 100. Examples of the event may include receiving a call signal, receiving a message, and/or receiving a key signal. Examples of the alarm signal output by the alarm module 155 may include an audio signal, a video signal and/or a vibration signal. More specifically, the alarm module 155 may output an alarm signal upon receiving a call signal or a message. Additionally, the alarm module 155 may receive a key signal and may output an alarm signal as feedback to the key signal. Therefore, the user may easily recognize occurrence of an event based on an alarm signal output by the alarm module 155. An alarm signal for notifying the user of occurrence of an event may be output not only by the alarm module 155 but also by the display module 151 and/or the audio output module 153.

The haptic module 157 may provide various haptic effects (such as vibration) that may be perceived by the user. If the haptic module 157 generates a vibration as a haptic effect, an intensity and a pattern of vibration generated by the haptic module 157 may be altered in various manners. The haptic module 157 may synthesize different vibration effects and may output a result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing a sense of heat or cold using a device capable of absorbing heat or generating heat. The haptic module 157 may be configured to enable the user to recognize a haptic effect using a kinesthetic sense of fingers or arms. The mobile terminal 100 may include two or more haptic modules 157.

The memory 160 may store various programs necessary for operation of the controller 180. The memory 160 may also temporarily store various data such as a phonebook, messages, still images, and/or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and/or a read-only memory (ROM). The mobile terminal 100 may operate a web storage that performs functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device and/or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control a general operation of the mobile terminal 100. For example, the controller 180 may perform various control operations regarding making/receiving a voice call, transmitting/receiving data, and/or making/receiving a video call. The controller 180 may include a multimedia player module 181 that plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to other components in the mobile terminal 100.

The mobile terminal 100 may include a wired/wireless communication system or a satellite communication system and may thus be able to operate in a communication system capable of transmitting data in units of frames or packets.

Figure 2:
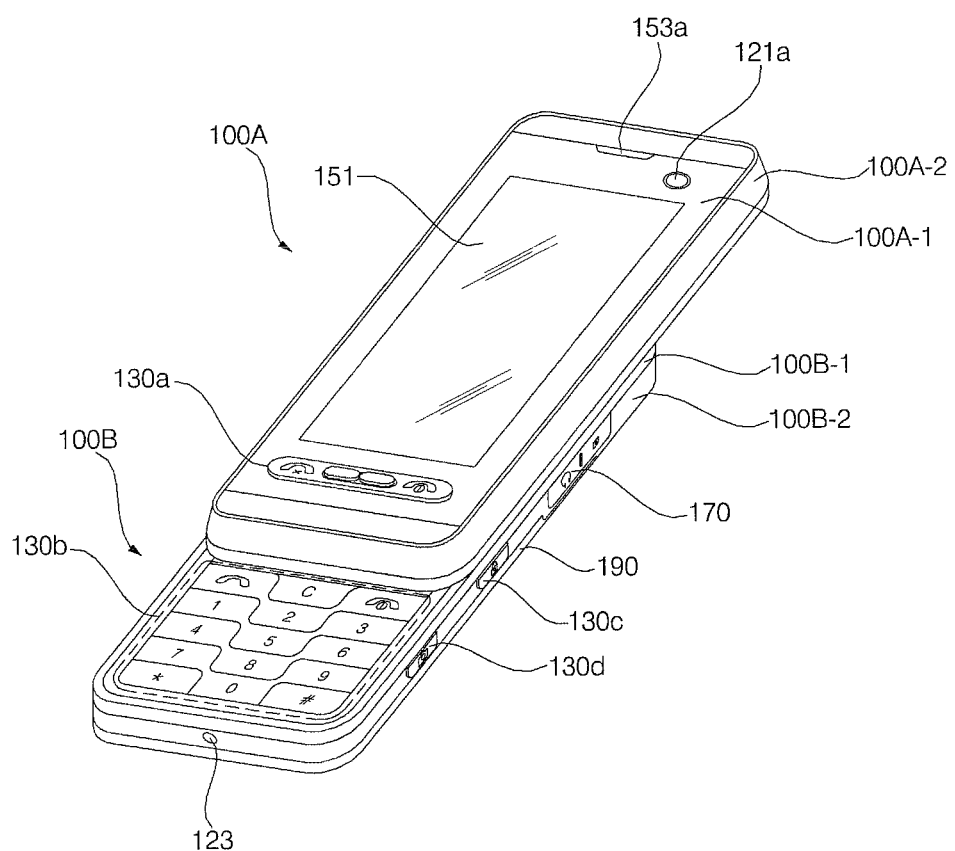
FIG. 2 illustrates a front perspective view of the mobile terminal shown in FIG. 1.
Figure 3:
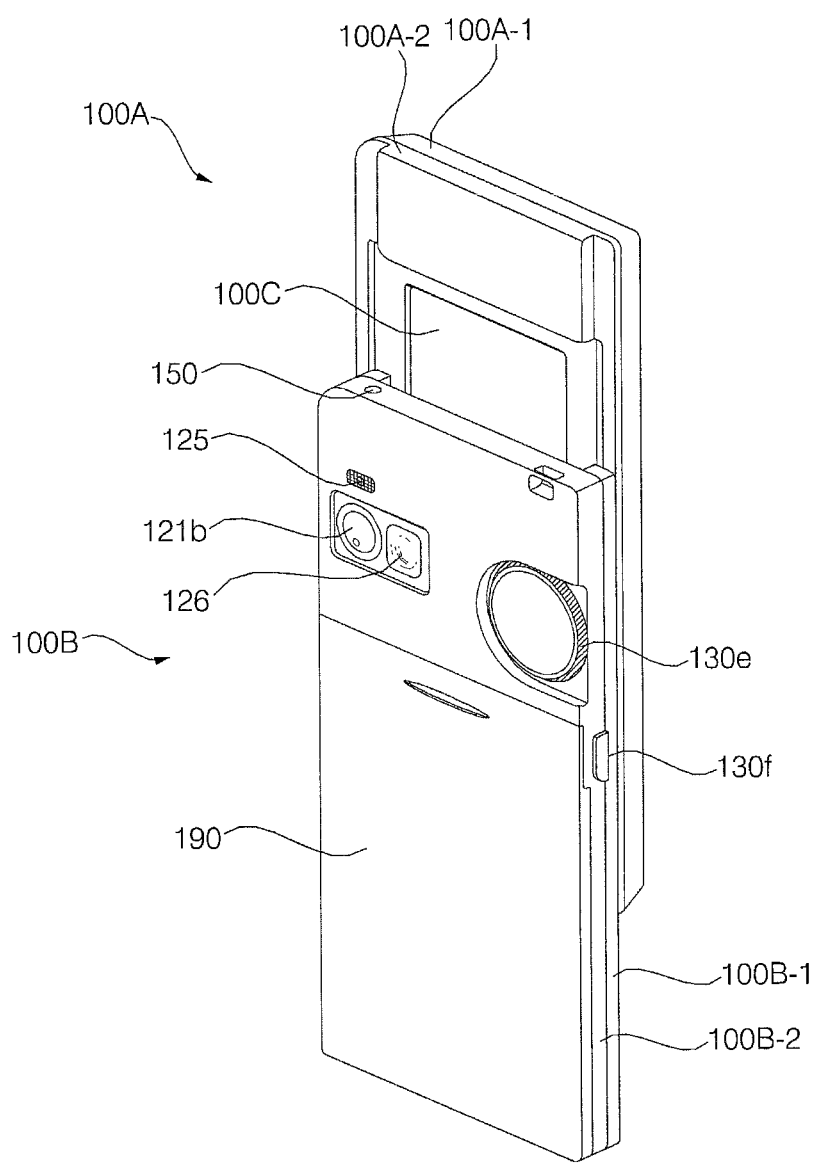
FIG. 3 illustrates a rear perspective view of the mobile terminal shown in FIG. 2.

FIG. 2 illustrates a front perspective view of the mobile terminal 100 shown in FIG. 1, and FIG. 3 illustrates a rear perspective view of the mobile terminal 100 shown in FIG. 2. Other embodiments and configurations may also be provided.

An exterior of the mobile terminal 100 may be described in detail with reference to FIGS. 2 and 3. For ease of discussion, the mobile terminal 100 may be considered a bar-type mobile terminal equipped with a touch screen. However, embodiments are not limited to a bar-type mobile terminal. Rather, embodiments may be applied to mobile phones other than a bar-type mobile terminal.

As shown in FIG. 2, the mobile terminal 100 may include a first body 100A and a second body 100B that can slide up or down against the first body 100A.

When the first body 100A and the second body 100B completely overlap each other, the mobile terminal 100 may be referred to as being closed (or in a closed state). On the other hand, when the first body 100A is slid up against the second body 100B and thus the front of the second body 100B is partially exposed, as shown in FIG. 2, the mobile terminal 100 may be referred to as being open (or in an opened stated).

When the mobile terminal 100 is closed, the mobile terminal may operate in a standby mode and may be released from the standby mode in response to user manipulation. On the other hand, when the mobile terminal 100 is open, the mobile terminal 100 may operate in a call mode and may be switched to the standby mode either manually in response to user manipulation or automatically after lapse of a predefined amount of time.

The exterior of the first body 100A may be defined by a first front case 100A-1 and a first rear case 100A-2. Various electronic devices may be installed in a space formed by the first front case 100A-1 and the first rear case 100A-2. The display module 151, a first audio output module 153a, a first camera 121a and a first user input module 130a may be provided in or on the front case 100A-1.

If a touch pad is configured to overlap the display module 151 and thus to form a layer structure, the display module 151 may serve as a touch screen and may thus allow the user to input various information to the mobile terminal 100 by touching the display module 151.

The first audio output module 153a may be implemented as a receiver and/or a speaker. The first camera 121a may be configured for capturing a still or moving image of the user.

The exterior of the second body 100B may be defined by a second front case 100B-1 and a second rear case 100B-2. A second user input module 130b may be provided in the second body 100B, and particularly at a front of the second front case 100B-1. Third and fourth user input modules 130c and 130d, the microphone 123 and the interface unit 170 may be provided in or on the second front case 100B-1 or the second rear case 100B-2.

The first through fourth user input modules 130a through 130d and fifth and sixth user input modules 130e and 130f may be collectively referred to as the user input unit 130. The user input unit 130 may adopt various manipulation methods as long as it can offer tactile feedback to the user.

The first user input module 130a may allow the user to enter various commands (such as 'start', 'end', and 'scroll'), the second user input module 130b may allow the user to enter various numerals, characters and/or symbols to the mobile terminal 100, and the third and fourth user input modules 130c and 130d may be used as hot keys for activating certain functions.

The microphone 123 may properly receive the user's voice and/or other sounds.

As shown in FIG. 3, the fifth user input module 130e, which may be of a wheel type, and the second camera 121b may be provided at the rear of the second rear case 100B-2 of the second body 100B or may be provided on one side of the second body 100B, and the sixth user input module 130f may be provided on one side of the second body 100B.

The second camera 121b may have a different photographing direction from the first camera 121a shown in FIG. 2. Additionally, the first and second cameras 121a and 121b may have different resolutions. For example, the first camera 121a may capture and then transmit an image of a face of the user during a video call. Thus, a low-resolution camera may be used as the first camera 121a. The second camera 121b may capture an image of an ordinary subject. The image captured by the second camera 121b may not need to be transmitted. Thus, a high-resolution camera may be used as the second camera 121b.

A camera flash 125 and a mirror 126 may be provided near the second camera 121b. The camera flash 125 may illuminate a subject when the user attempts to capture an image of the subject with the second camera 121b. The mirror 126 may be used to prepare the user for taking a self shot.

A second audio output module (not shown) may be additionally provided in the second rear case 100B-2. The second audio output module may realize a stereo function along with the first audio output module 153a. The second audio output module may also be used in a speaker-phone mode.

A second audio output module (not shown) may be additionally provided in the second rear case 100B-2. The second audio output module may realize a stereo function along with the first audio output module 153a. The second audio output module may also be used in a speaker-phone mode.

An antenna for receiving a broadcast signal may be provided on one side of the second rear case 100B-2. The antenna may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The power supply unit 190 may be provided in the second rear case 100B-2. The power supply unit 190 may be a rechargeable battery and may be coupled to the second rear case 100B-2 so as to be attachable to or detachable from the second rear case 100B-2.

The second camera 121b, the antenna 105, and the camera flash 125, which have been described as being provided in the rear case 100A-2, may be provided in the front case 100A-1. In this case, when the mobile terminal 100 is closed, the second camera 121b, the antenna 105, and the camera flash 125 may be protected by the second body 100B.

A third camera (not shown) may be additionally provided in the second rear case 100B-2, and may serve as a dual camera together with the second camera 121b.

The first camera 121a may be rotatable and may thus cover the photographing direction of the second camera 121b. The second camera 121b may thus be optional.

Figure 4A:
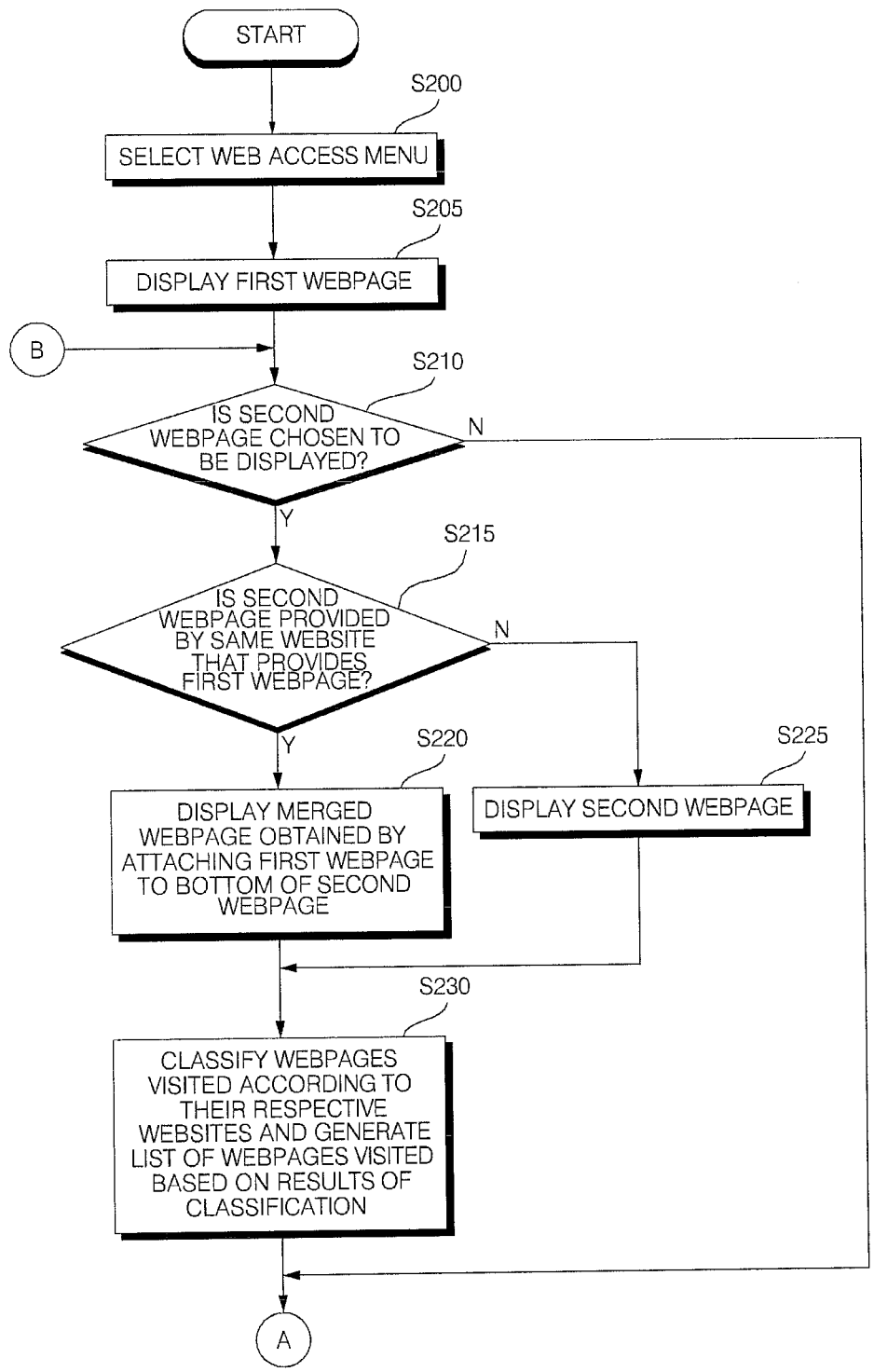
FIGS. 4A and 4B are flowcharts of a method of controlling an operation of a mobile terminal according to an exemplary embodiment of the present invention.
Figure 4B:
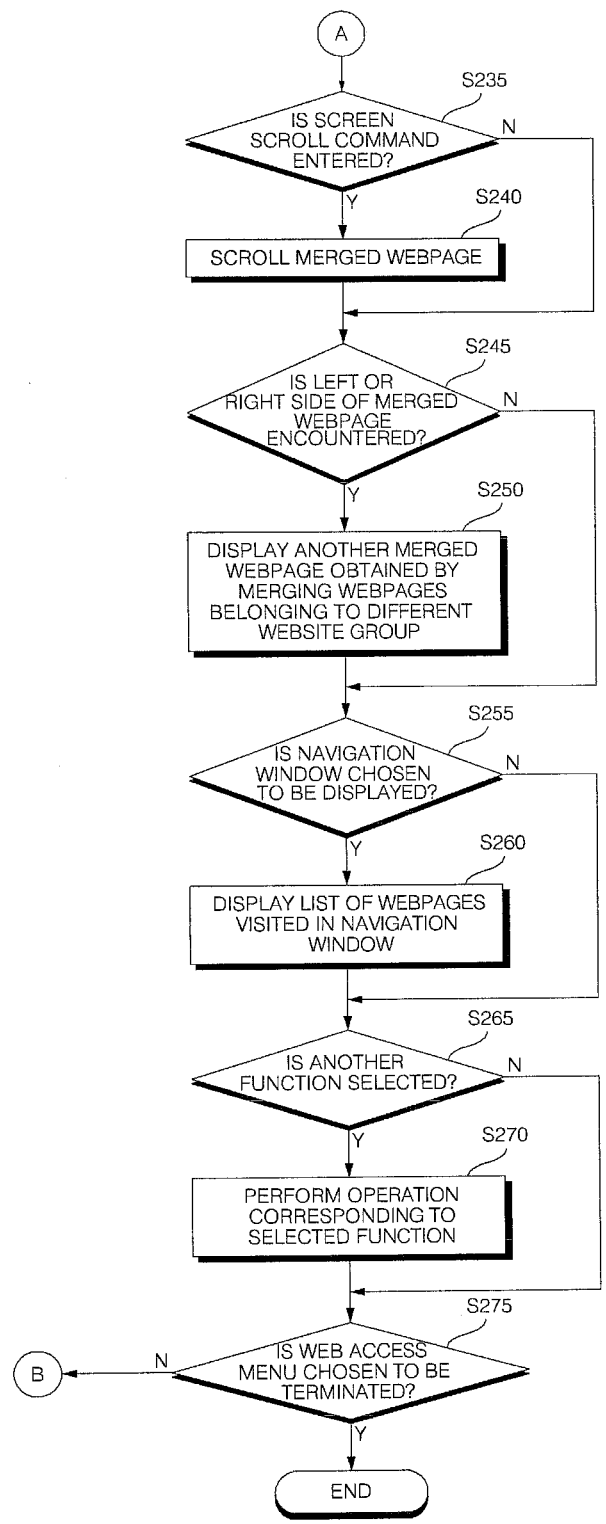
Figure 5A:
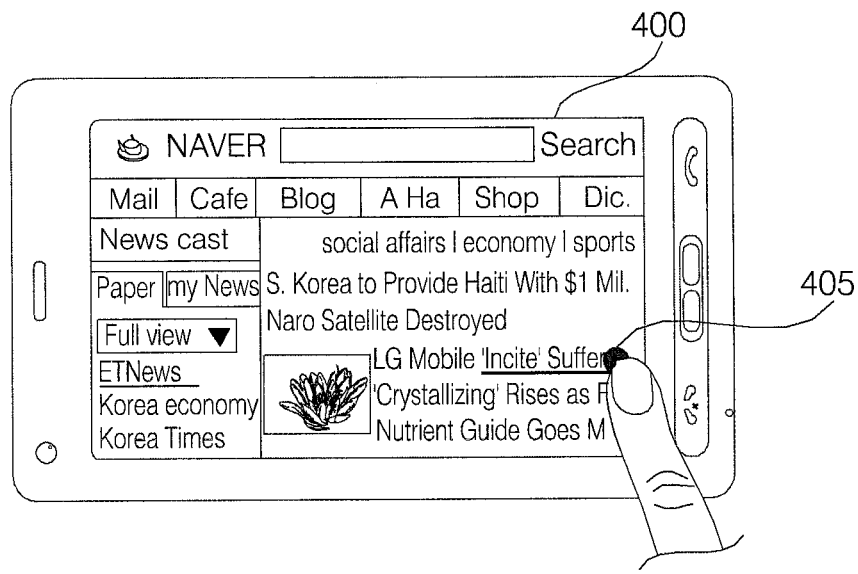
FIGS. 5(*a*)-8(*c*) are diagrams for explaining merging a plurality of webpages.
Figure 5B:
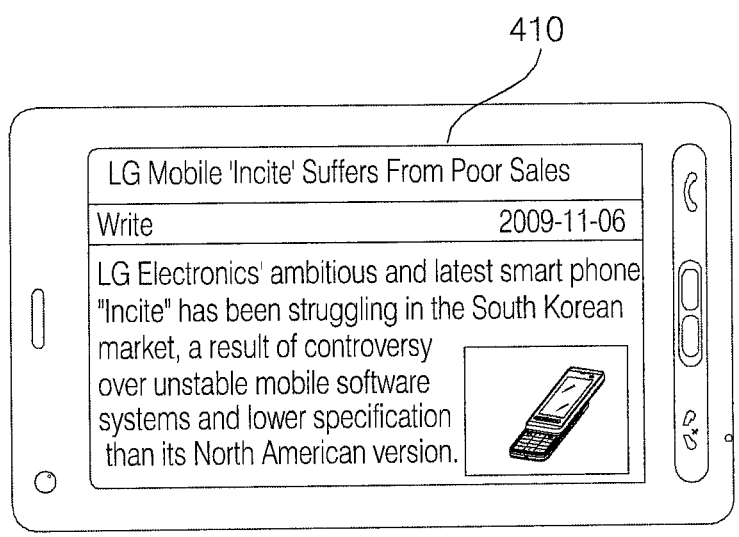
Figure 5C:
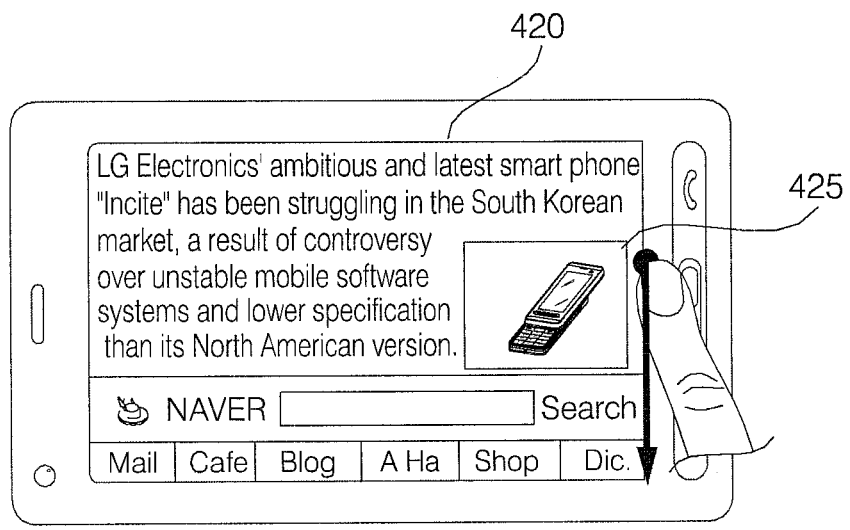
Figure 5D:
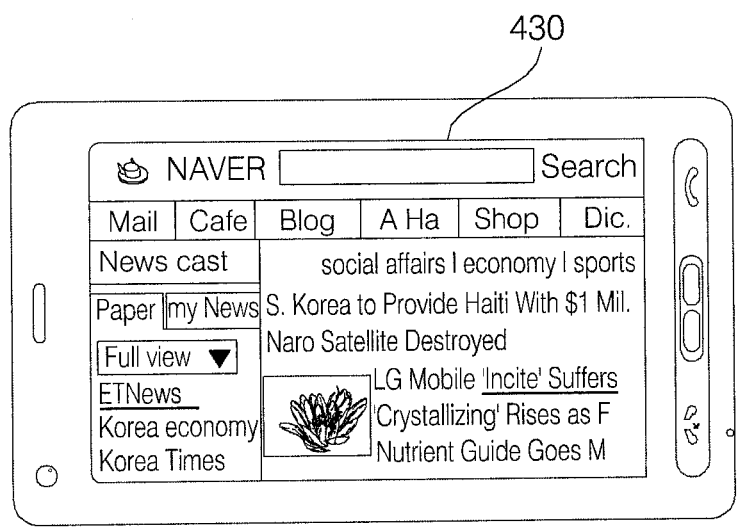

FIGS. 4A and 4B are flowcharts of a method of controlling operation of a mobile terminal according to an exemplary embodiment of the present invention. Other operations, orders of operations and embodiments may also be within the scope of the present invention. As shown in FIG. 4A, a web access menu may be selected in response to a user command (S200), the controller 180 may drive a web browser, and the controller 180 may control the wireless internet module 115 to access a first webpage. The controller 180 may display the first webpage on the display module 151 (S205).

Thereafter, if the user chooses to display a second webpage (S210), the controller 180 may determine in operation S215 whether the second webpage is provided by a same website that provides the first webpage. If it is determined in operation S215 that the second webpage is provided by the same website that provides the first webpage, the controller 180 may display in operation S220 a merged webpage obtained by attaching the first webpage to a bottom of the second webpage on the display module 151.

A uniform resource locator (URL) may be represented as "protocol name://IP address (domain name)/directory port number." In this embodiment, a plurality of webpages having a same URL may be merged into a single webpage.

On the other hand, if it is determined in operation S215 that the first webpage and the second webpage are provided by different websites, the controller 180 may display the second webpage rather than the first webpage on the entire display module 151 in operation S225.

Thereafter, the controller 180 may generate a list of pages visited for each website, and the controller 180 may store the generated list in the memory 160 in operation S230. More specifically, the controller 180 may classify a plurality of webpages that were visited, including the first webpage and the second webpage, according to their respective websites, and the controller 180 may generate a list of webpages visited based on results of the classifying. The generated list may be displayed upon request for a navigation window. Each of the website groups in the generated list may be registered as a Favorite.

Thereafter, as shown in FIG. 4B, if a screen scroll command is determined to have been entered in operation S235, the controller 180 may control the merged webpage to be scrolled in operation S240 in response to the entered screen scroll command. A screen scroll command may be entered using the user input unit 130, for example. If a touch-and-drag input is received through the display module 151, which includes a touch screen, the controller 180 may control the merged webpage to be scrolled in a direction represented by the received touch-and-drag input.

If the merged webpage is scrolled to the extent that the left side or the right side of the merged webpage is encountered (S245), the controller 180 may display, in operation S250, another merged webpage obtained by merging a plurality of webpages belonging to a different website group from the first webpage and the second webpage on the display module 151.

If the user chooses to display a navigation window in operation S255, the controller 180 may display a navigation window on the display module 151, and the controller 180 may display, in operation S260, the list (generated in operation S230) in the navigation window.

The navigation window may be displayed on a certain part of the display module 151. The navigation window may be displayed as a popup window or a semitransparent window over a webpage currently being displayed on the display module 151. The navigation window may be enlarged or reduced by being dragged. If one of a number of webpage items displayed in the navigation window is selected, a webpage corresponding to the selected webpage item may be displayed on the display module 151.

If one of a number of functions of the web access menu is determined to have been selected in operation S265, the controller 180 may control the selected function to be performed in operation S270. Operations S210 through S270 may be repeatedly performed until the user chooses to terminate the web access menu as determined in operation S275.

A plurality of webpages provided by a same website may be displayed at a same time by merging the webpages into a single webpage.

When a merged webpage obtained by merging a plurality of webpages is displayed on the display module 151, a plurality of thumbnail images respectively representing the plurality of webpages may also be displayed on the display module 151. If one of the plurality of thumbnail images is selected, a webpage represented by the selected thumbnail image may be displayed on the entire display module 151. If the plurality of thumbnail images are rearranged, the plurality of webpages in the merged webpage may be rearranged accordingly.

FIGS. 5($a$)-15 are diagrams for explaining embodiment(s) of FIGS. 4A and 4B. Other embodiments and configurations may also be provided.

More specifically, FIGS. 5($a$)-8($c$) illustrate how to merge a plurality of webpages into a single webpage. If a text link in a webpage 400 is touched as indicated by reference numeral 405 in FIG. 5($a$), a webpage 410 corresponding to the touched text link may He displayed in FIG. 5($b$).

Referring to FIG. 5($c$), if the webpage 410 is provided by a same website that provides the webpage 400, a webpage 420 into which the webpages 400 and 410 are merged may be displayed. The webpage 420 may be obtained by attaching the webpage 400 to a bottom of the webpage 410. If the webpage 420 is scrolled down, the same webpage as the webpage 400 may appear, as shown by reference numeral 430 in FIG. 5($d$).

On the other hand, if the webpages 400 and 410 are provided by different websites, the webpage 410 may be displayed as a new page rather than being merged with the webpage 400.

In summary, a plurality of webpages provided by a same website may be merged into a single merged webpage. Thus, a user may easily identify each of the plurality of webpages by scrolling the single merged webpage without the need to navigate from one webpage to another webpage.

FIG. 6 is a diagram of a merged webpage obtained by merging a plurality of webpages provided by a same website. As shown in FIG. 6, three webpages 440, 450 and 460 provided by a same website may be merged into a single merged webpage, and may thus be easily identified simply by scrolling up or down the single merged webpage. A total number of webpages merged into the single merged webpage and a page number of each of the webpages merged into the single merged webpage may be displayed, as shown by reference numeral 453.

Figure 7:
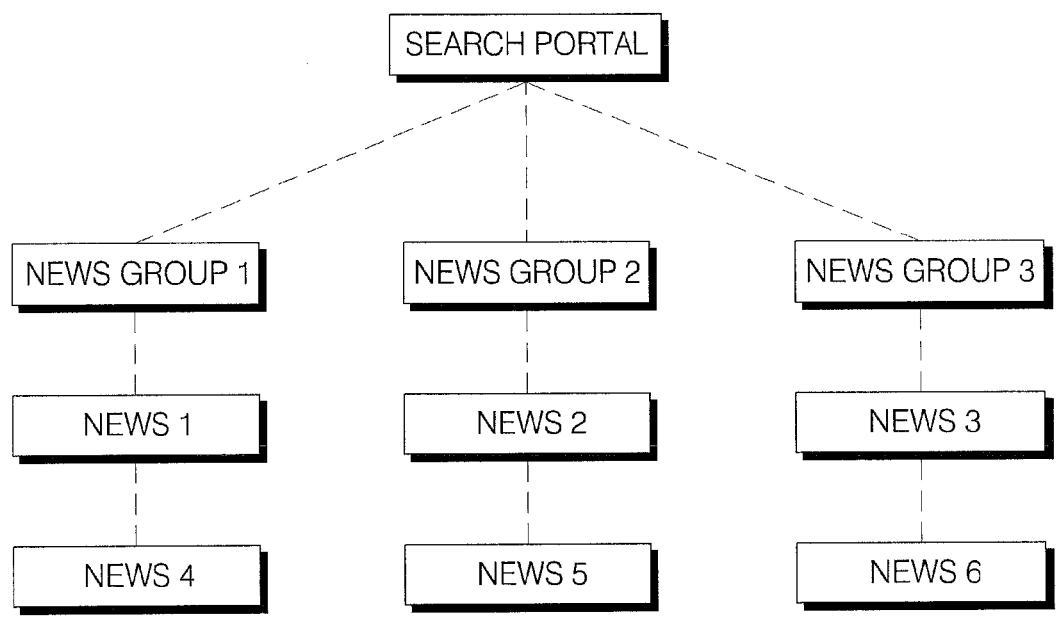

FIG. 7 is a diagram of how to arrange a plurality of webpages visited by a user in accordance with their respective websites. Referring to FIG. 7, a plurality of news webpages accessed from a predetermined search portal may be classified into one or more groups, e.g., 'News Group 1,' 'News Group 2,' and 'News Group 3,' according to their respective URLs, and results of the classification may be rendered as a tree structure.

For example, a number of webpages provided by accessing a newspaper website 'Hankyoreh' from a search portal 'Naver' and conducting a search for news articles at the newspaper website 'Hankyoreh' may be classified into the group 'News Group 1.' A number of webpages provided by accessing a newspaper website 'ETNews' from the search portal 'Naver' and conducting a search for news articles at the newspaper website 'ETNews' may be classified into the group 'News Group 2.'

Accordingly, a plurality of webpages visited by a user may be classified into one or more website groups, and may then be effectively managed in units of the website groups.

Figure 8A:
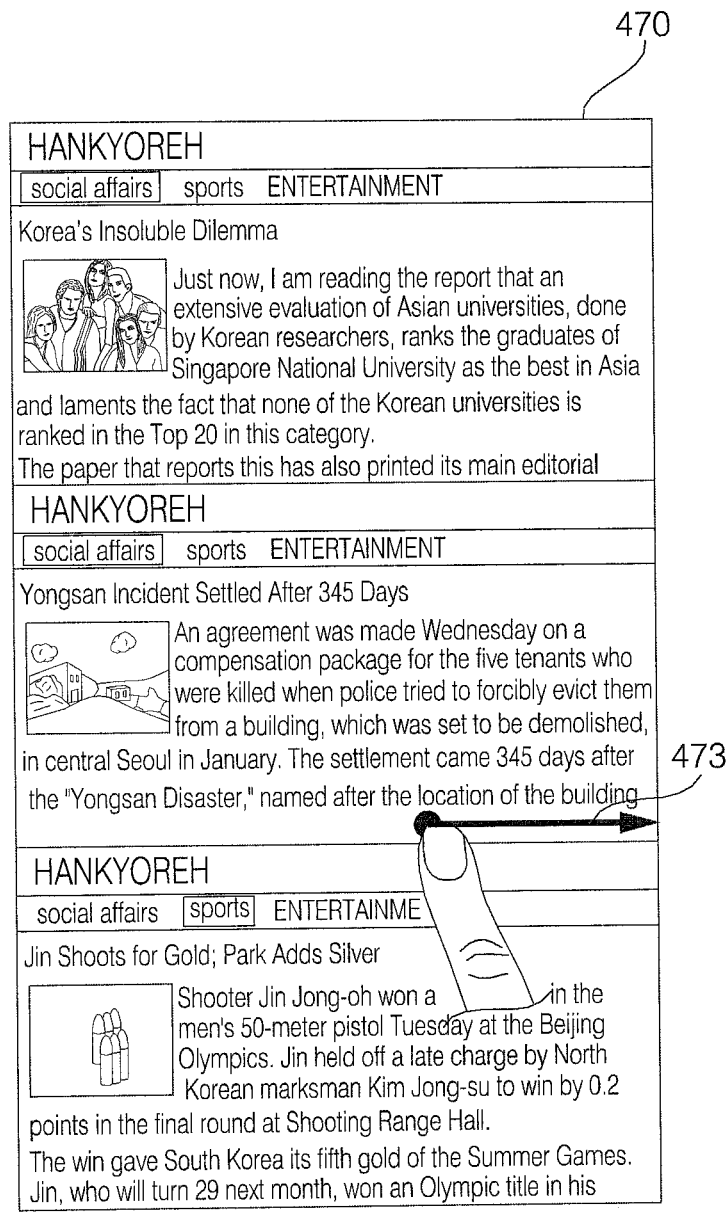
Figure 8B:
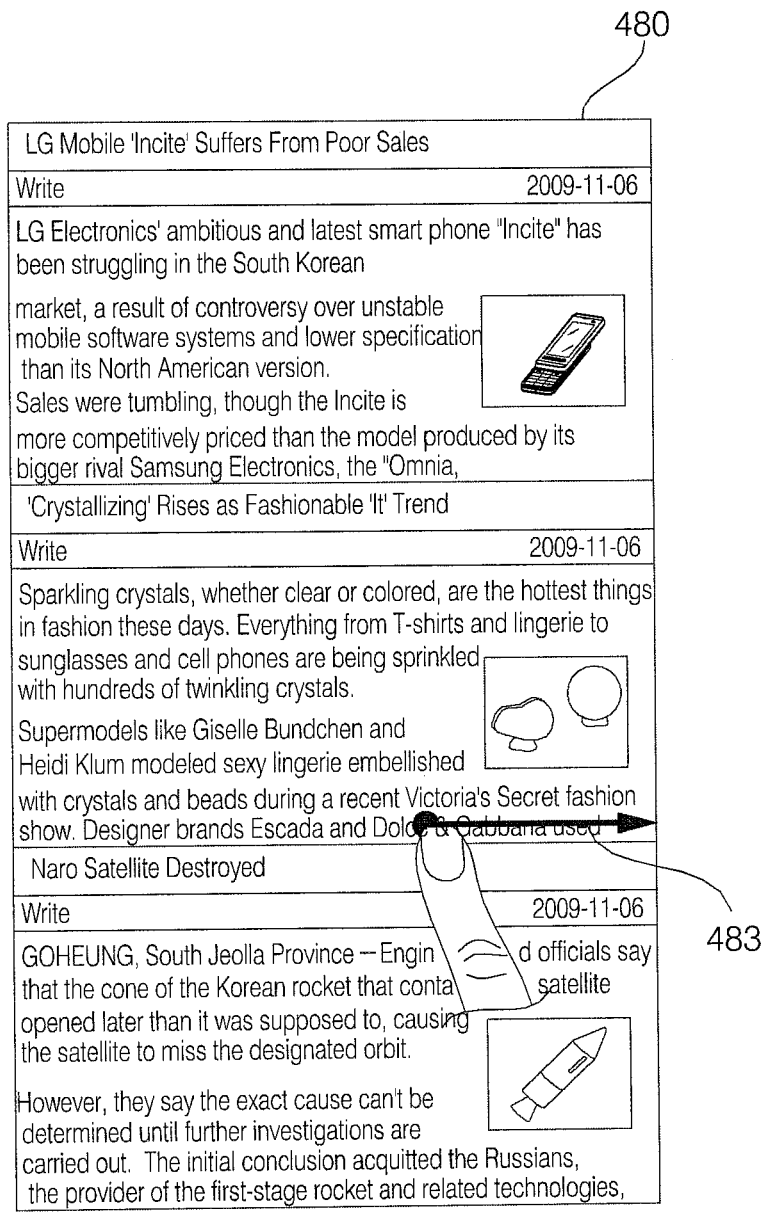
Figure 8C:
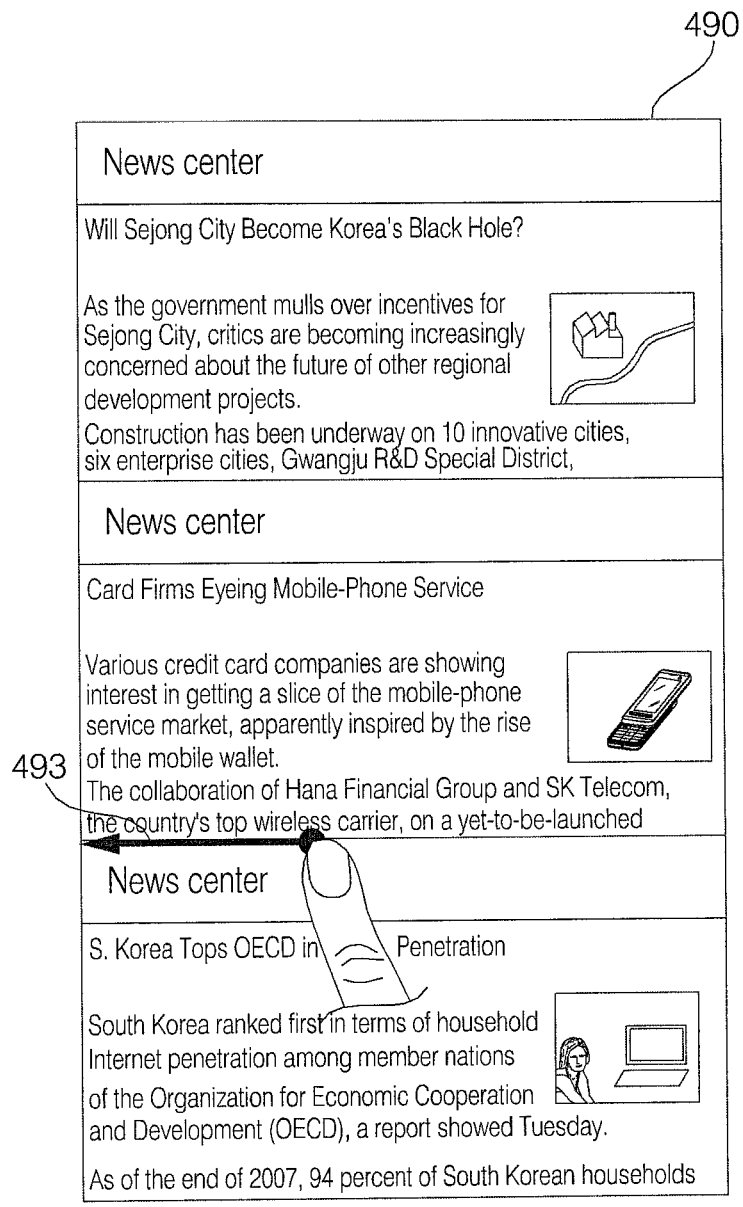

FIGS. 8(a)-8(c) illustrates diagrams of three merged webpages belonging to different website groups. As shown in FIGS. 8(a) and 8(b), if a merged webpage 470 obtained by merging a plurality of webpages belonging to a first website group is dragged to the right, as shown by reference numeral 473, a merged webpage 480 obtained by merging a plurality of webpages belonging to a second website group may be displayed on the display module 151. If the merged webpage 480 is dragged to the left, the merged webpage 470 may be displayed on the display module 151.

As shown in FIG. 8(c), if a merged webpage 490 obtained by merging a plurality of webpages belonging to a third website group is dragged to the left, as shown by reference numeral 493, the merged webpage 480 may be displayed on the display module 151. On the other hand, if the merged webpage 490 is dragged to the right, the merged webpage 470 may be displayed on the display module 151.

Thus, a user may quickly flip through a plurality of webpages through dragging.

FIGS. 9(a)-11 are diagrams for explaining various operations associated with a navigation window.

Figure 9A:
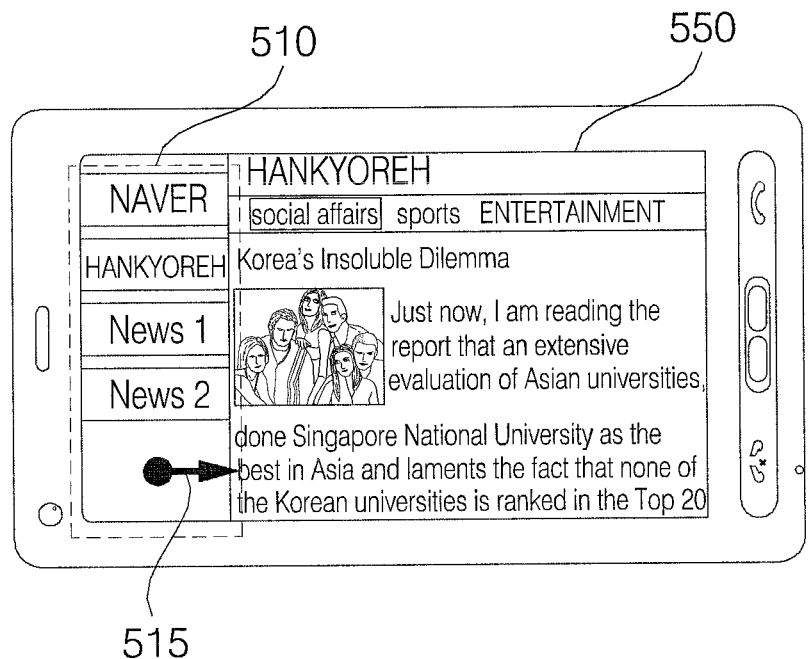
FIGS. 9(*a*)-11 are diagrams for explaining various operations associated with a navigation window.
Figure 9B:
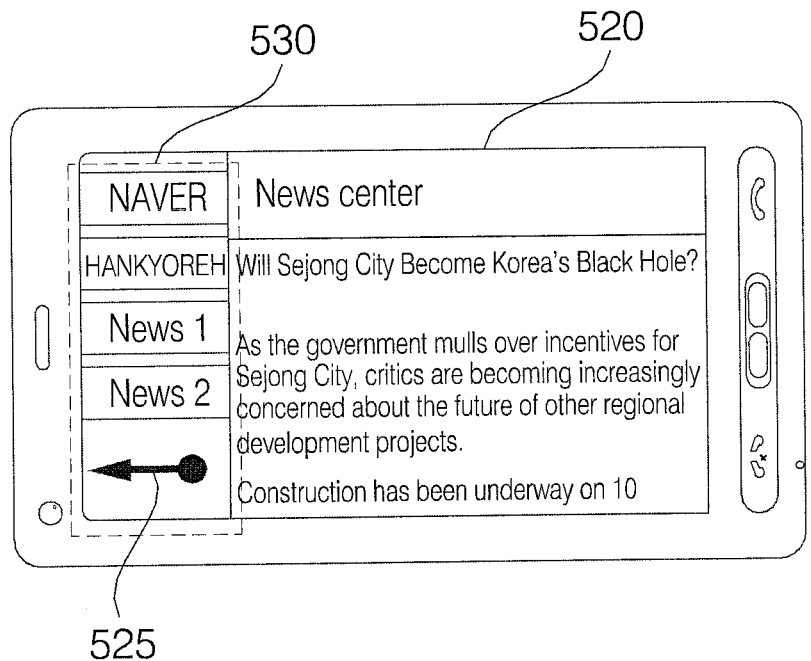

More specifically, FIGS. 9(a)-9(b) illustrates a screen including a navigation window. As shown in FIG. 9(a), a navigation window 510 showing a tree of webpages visited by the user may be displayed over a particular part of a screen 500 showing a merged webpage upon request. If the navigation window 510 is too small to display the whole webpage tree, the navigation window 510 may display only a part of the webpage tree corresponding to a website group 'Hankyoreh' that the merged webpage currently being displayed on the screen 500 belongs to. As shown in FIGS. 9(a) and 9(b), if the navigation window 510 is dragged, as shown by reference numeral 515, a screen 520 showing another merged webpage classified into a different website group (i.e., a website group 'News Center') from the merged webpage of the screen 500 and a navigation window 530 showing a tree of webpages classified into the website group 'News Center' may be displayed.

If one of a number of webpage items shown in the navigation window 510 or 530 is selected, a webpage corresponding to the selected webpage item may be displayed.

Figure 10A:
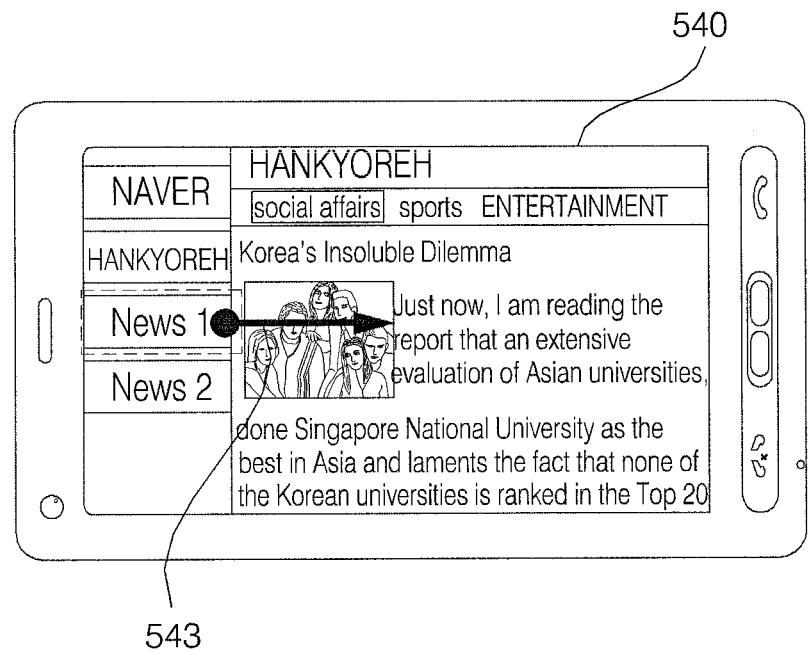
Figure 10B:
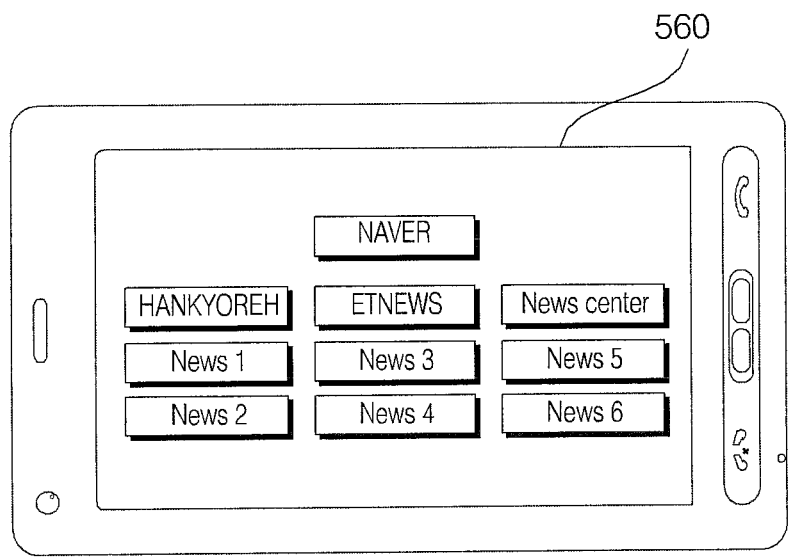

As shown in FIGS. 10(a) and 10(b), if an edge of a navigation window is dragged, as shown by reference numeral 543, the navigation window may be displayed on the entire display module 151, as shown by reference numeral 560.

Figure 11:
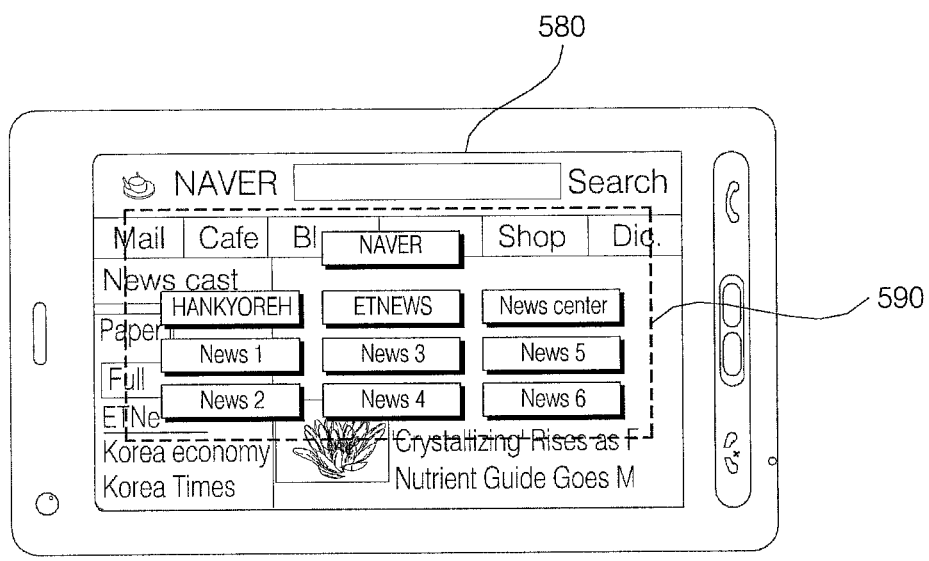

As shown in FIG. 11, a navigation window 590 may be displayed semi-transparently over a screen 580 showing a predetermined webpage. Alternatively, the navigation window 590 may be displayed as a popup window.

Figure 12:
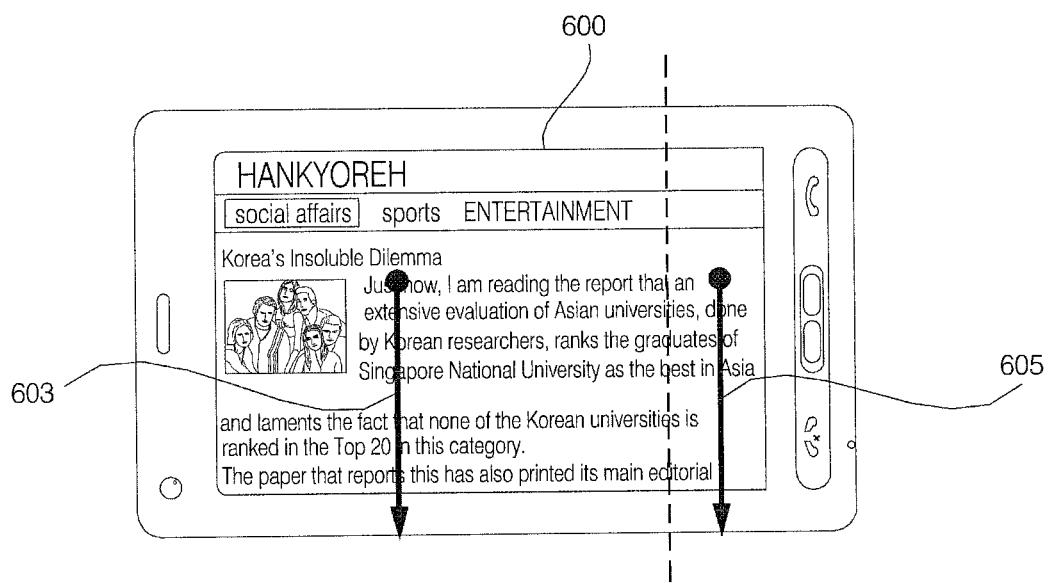
FIGS. 12-14 are diagrams for explaining various methods for scrolling a merged webpage.
Figure 13:
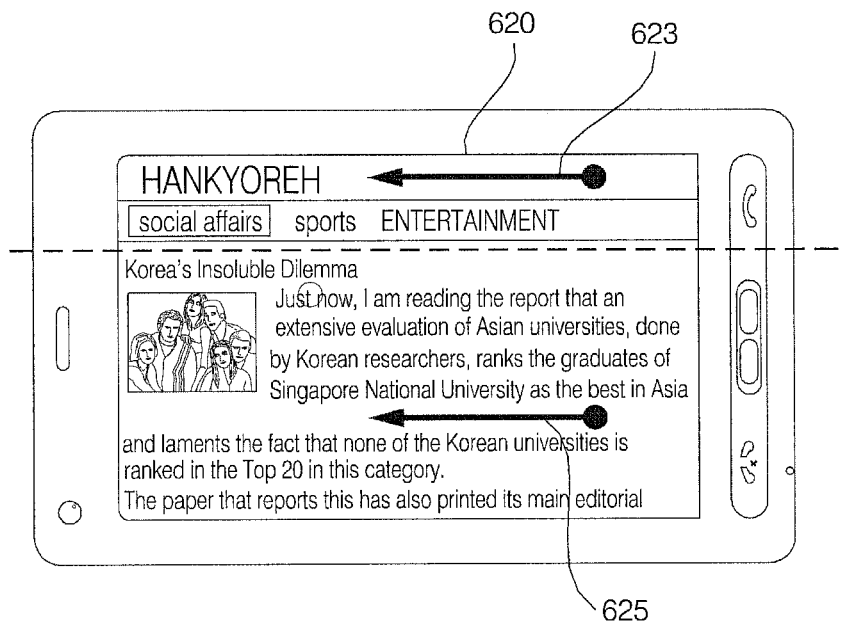
Figure 14:
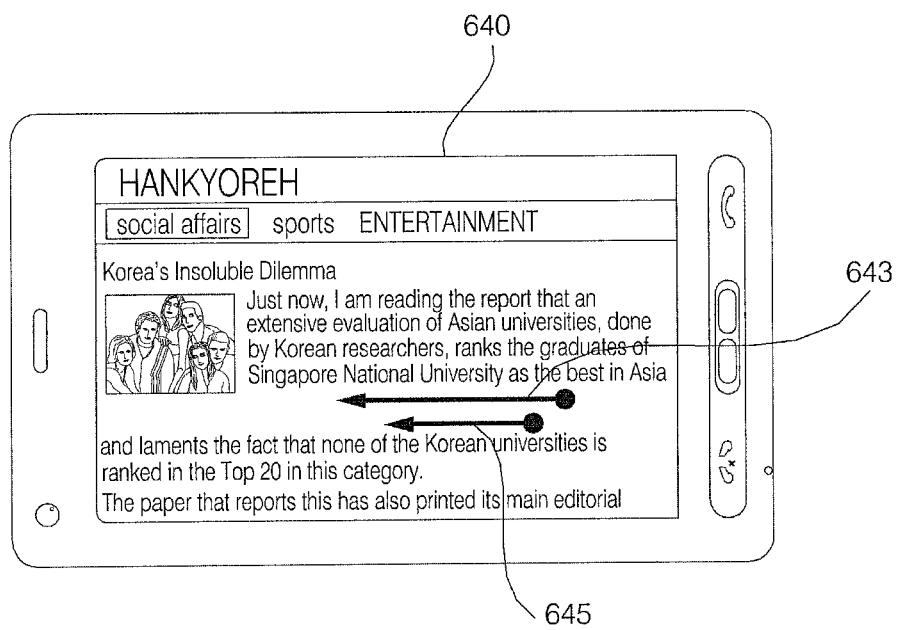

FIGS. 12 through 14 are diagrams for explaining various methods for scrolling a merged webpage.

As shown in FIG. 12, if a left part of a webpage 600 is dragged, as shown by reference numeral 603, the webpage 600 may be scrolled line by line. On the other hand, if a right part of the webpage 600 is dragged, as shown by reference numeral 605, the webpage 600 may be scrolled page by page.

As shown in FIG. 13, if an upper part of a webpage 620 is dragged, as shown by reference numeral 623, the webpage 620 may be scrolled line by line. On the other hand, if a lower part of the webpage 620 is dragged, as shown by reference numeral 625, the webpage 620 may be scrolled page by page.

As shown in FIG. 14, if a webpage 640 is dragged by a long distance, as shown by reference numeral 643, the webpage 640 may be scrolled line by line. On the other hand, if the webpage 640 is dragged by a short distance, as shown by reference numeral 645, the webpage 640 may be scrolled page by page.

In summary, a screen displayed on the display module 151 may be scrolled in various manners according to how the screen is dragged.

Figure 15A:
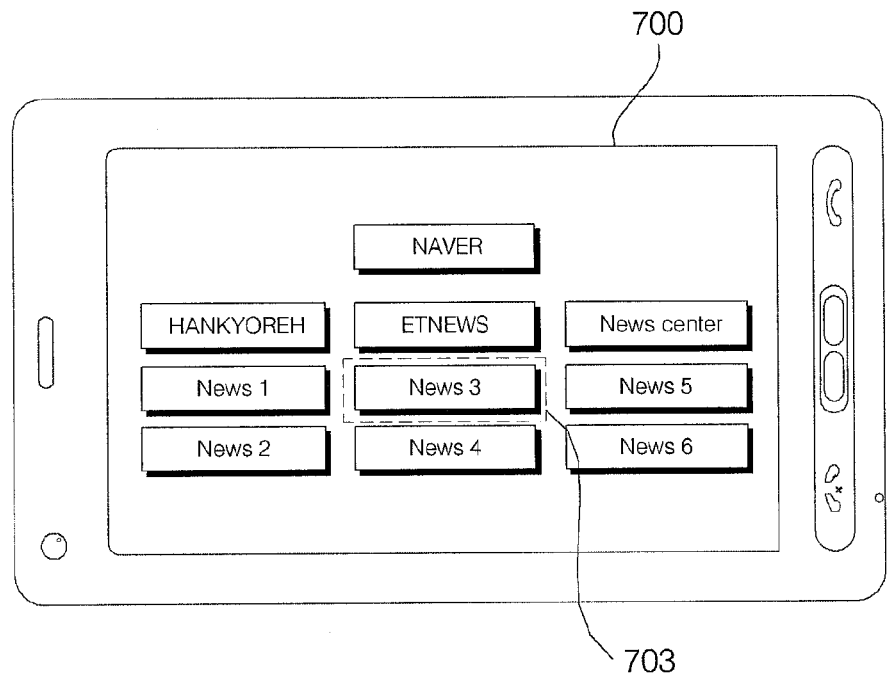
FIGS. 15(*a*)-15(*b*) are diagrams for explaining conducting a search using a navigation window.
Figure 15B:
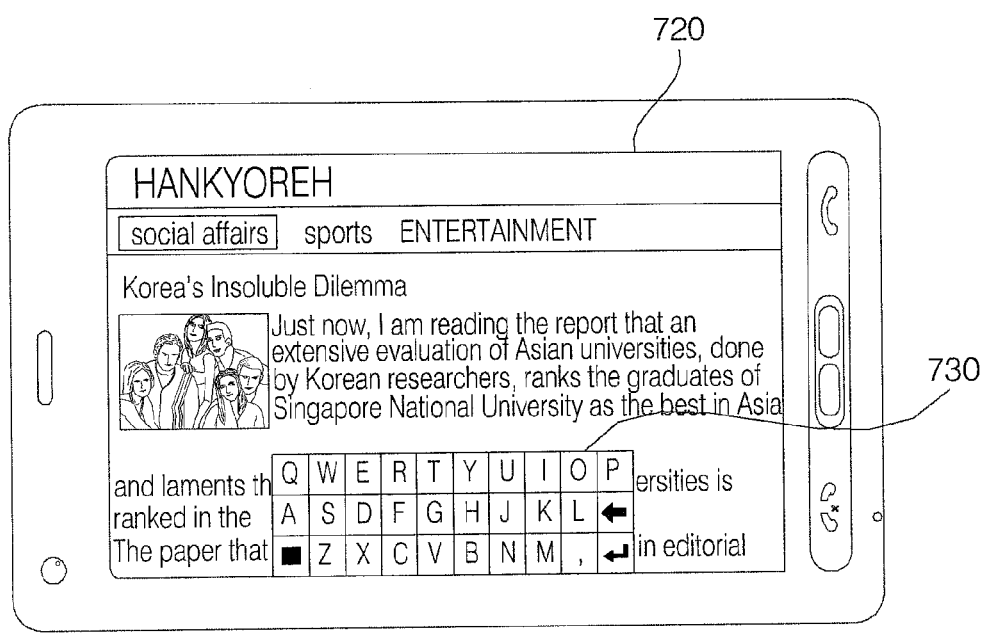

FIGS. 15(a)-15(b) show diagrams for explaining how to conduct a search. As shown in FIGS. 15(a) and 15(b), if a webpage item 'News 3' 703 is selected from a navigation window screen 700, a webpage 720 corresponding to the webpage item 'News 3' 703 may be displayed. If the user chooses to conduct a search on the webpage 720, a character input window 730 for entering a keyword may be displayed.

If a keyword is entered through the character input window 730, a search for the entered keyword may be conducted not only on a website 'JoongAng' where the webpage item 'News 3' item 703 belongs but also on a website 'Hankyoreh' or on a website 'ETNews.'

A website group including one or more webpages may be registered as a Favorite, and may then be automatically named using a given keyword. For example, a number of webpages provided as a result of conducting a search on the website 'Hankyoreh' using a keyword 'Environment' may be registered as a Favorite named 'Hankyoreh_Environment,' and a number of webpages provided as a result of conducting a search at the website 'JoongAng' using a keyword 'Weather' may be registered as a Favorite named 'JoongAng_Weather.'

If one of a number of website groups registered as Favorites is selected, one or more popup windows of each webpage classified into the selected website group may all pop up at a same time especially when the Favorites are links to websites or webpages, rather than images of the websites or webpages, thus causing inconvenience. In order to address this, the popup windows of each webpage classified into the selected website group may be configured to be displayed only when a corresponding webpage is loaded and displayed on the entire display module 151.

When a merged webpage is refreshed, a number of webpages merged into the merged webpage may be sequentially refreshed in their order in a tree structure. In order to prevent a speed of loading a merged webpage from slowing down due to a considerable amount of data that needs to be processed or excessive traffic, a predetermined webpage merged into the merged webpage may be loaded first, and then other webpages merged into the merged webpage may be sequentially refreshed in their order in a tree structure.

If a 'Find' menu is selected when a predetermined webpage is displayed, the 'Find' menu may be executed on the predetermined webpage, on all the webpages classified into the same website group as the predetermined webpage, and/or on all the webpages ever visited by the user.

Embodiments of the present invention may be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium may include a ROM, a RAM, a CD-ROM, a magnetic tape, a floppy disc, an optical data storage, and/or a carrier wave (e.g., data transmission through the internet). The computer-readable recording medium may be distributed over a plurality of computer systems connected to a network so that computer-readable code is written thereto and executed therefrom in a decentralized manner. Functional programs, code, and code segments needed for realizing embodiments of the present invention may be easily construed by one of ordinary skill in the art.

Accordingly, a plurality of webpages provided by a same website may be merged into a single webpage and thus may allow a user to easily identify each of the webpages simply through scrolling. Therefore, navigation may be facilitated from one webpage to another webpage and a plurality of webpages may be displayed at a same time.

Embodiments of the present invention may provide a mobile terminal and a method of controlling an operation of the mobile terminal that can merge a plurality of webpages provided by a website into a single webpage and may thus allow a user to easily search through the plurality of webpages by scrolling the single webpage.

A method may be provided of controlling an operation of a mobile terminal. The method may include displaying a first webpage on a display module, and if a second webpage is chosen to be displayed, determining whether the second webpage is provided by the same website that provides the first webpage. Additionally, if the second webpage is provided by the same website that provides the first webpage, merging the first and second webpages into a third webpage and displaying the third webpage on the display module.

A mobile terminal may include a display module configured to display a first webpage on a display module, and a controller. If a second webpage is chosen to be displayed, the controller may determine whether the second webpage is provided by the same website that provides the first webpage, merges the first webpage and the second webpage into a third webpage and displays the third webpage on the display module if the second webpage is provided by the same website that provides the first webpage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal, the method comprising:
    displaying a first webpage on a display module;
    receiving an input signal for requesting a display of a second webpage while the first webpage is displayed on the display module;
    determining, at the mobile terminal, whether the second webpage is provided by a same website that provides the first webpage;
    combining, at the mobile terminal, a top portion of the first webpage and a bottom portion of the second webpage into a third webpage and simultaneously displaying the third webpage on the display module when the determining determines that the same website provides the second webpage and the first webpage;
    storing a list of webpages visited for each website in a memory of the mobile terminal, wherein the webpages of the list are classified into one or more website groups based on their respective websites;
    scrolling through the third webpage line by line when the third webpage displayed on the display module is touched and dragged by a long distance, and scrolling through the third webpage page by page when the third webpage displayed on the display module is touch and dragged by a short distance; and
    displaying, on the display module, another webpage obtained by combining one or more webpages belonging to a second website group of the list different from a first website group of the first webpage and the second webpage when the third webpage is scrolled through a touch and drag input such that a left boundary or a fight boundary of the third webpage encounters a left side or a right side of the touch screen.

2. The method of claim 1, further comprising: displaying a navigation window that includes a plurality of webpage items respectively corresponding to a plurality of the visited webpages.

3. The method of claim 2, further comprising: selecting one of the plurality of webpage items displayed in the navigation window; and displaying a webpage corresponding to the selected webpage item on the display module.

4. The method of claim 2, wherein displaying the navigation window comprises displaying the navigation window semi-transparently over the third webpage.

5. The method of claim 2, wherein displaying the navigation window comprises displaying the navigation window as a popup window.

6. The method of claim 2, wherein displaying the navigation window comprises displaying the navigation window on a particular part of the display module.

7. The method of claim 1, further comprising displaying a total number of webpages combined into the third webpage and a page number of each of the webpages combined into the third webpage.

8. The method of claim 1, further comprising conducting a search for an entered keyword on a webpage obtained by combining one or more webpages belonging to a different website group from a website group of the first and second webpages when a keyword is input while the third webpage is displayed on the display module.

9. The method of claim 1, further comprising displaying two thumbnail images respectively corresponding to the first webpage and the second webpage on a part of the display module in order to indicate that a portion of the first webpage and a portion of the second webpage are combined into the third webpage.

10. A mobile terminal having a touch screen, the mobile terminal comprising:
    a display module configured to display webpage information;
    an input unit configured to receive a signal for accessing a website that provides the webpage information; and
    a controller configured:
        to determine whether a second webpage is provided by a same website that provides a first webpage that is displayed on the display module, to combine a top portion of the first webpage and a bottom portion of the second webpage into a third webpage and to simultaneously display the third webpage on the display module when the controller determines that the second webpage is provided by the same website that provides the first webpage, to store a list of webpages visited for each website in a memory of the mobile terminal, wherein the webpages of the list are classified into one or more website groups based on their respective websites, to scroll through the third webpage line by line when the third webpage displayed on the display module is touched and dragged by a long distance, and to scroll through the third webpage page by page when the third webpage displayed on the display module is touch and dragged by a short distance; and to control the display module to display another webpage obtained by combining one or more webpages belonging to a second website group of the list different from a first website group of the first webpage and the second webpage when the third webpage is scrolled through a touch and drag input such that a left boundary or a right boundary of the third webpage encounters a left side or a right side of the touch screen.

11. The mobile terminal of claim 10, wherein the controller controls the display module to display a navigation window that includes a plurality of webpage items respectively corresponding to a plurality of the visited webpages.

12. The mobile terminal of claim 10, wherein the controller controls the display module to display a total number of webpages combined into the third webpage and a page number of each of the webpages combined into the third webpage.

13. The mobile terminal of claim 10, wherein the controller controls the display module to display two thumbnail images respectively corresponding to the first webpage and the second webpage on a part of the display module in order to indicate that a portion of the first webpage and a portion of the second webpage are combined into the third webpage.

* * * * *